US005173604A

United States Patent [19]

Kelley

[11] Patent Number: 5,173,604

[45] Date of Patent: Dec. 22, 1992

[54] MASS SPECTROMETRY METHOD WITH NON-CONSECUTIVE MASS ORDER SCAN

[75] Inventor: Paul Kelley, San Jose, Calif.

[73] Assignee: Teledyne CME, Mountain View, Calif.

[21] Appl. No.: 698,313

[22] Filed: May 10, 1991

Related U.S. Application Data

[63] Continuation-in-part of Ser. No. 662,191, Feb. 28, 1991.

[51] Int. Cl.[5] ........................ B01D 59/44; H01J 49/00

[52] U.S. Cl. ........................ 250/282; 250/292

[58] Field of Search ........................ 250/282, 291, 292

[56] References Cited

U.S. PATENT DOCUMENTS

| | | | |
|---|---|---|---|
| 4,105,917 | 8/1978 | McIver et al. | 250/292 |
| 4,540,884 | 9/1985 | Stafford et al. | 250/282 |
| 4,650,999 | 3/1987 | Flies et al. | 250/282 |
| 4,736,101 | 4/1988 | Syka et al. | 250/292 |
| 4,749,860 | 6/1988 | Kelley et al. | 250/282 |
| 4,755,670 | 7/1988 | Syka et al. | 250/291 |
| 4,771,172 | 9/1988 | Weber-Grabau et al. | 250/282 |
| 4,818,869 | 4/1989 | Weber-Grabau | 250/282 |
| 4,882,484 | 11/1989 | Franzen et al. | 250/282 |
| 4,975,577 | 12/1990 | Franzen et al. | 250/291 |
| 5,075,547 | 12/1991 | Johnson et al. | 250/292 |

FOREIGN PATENT DOCUMENTS

| | | |
|---|---|---|
| 180328 | 5/1986 | European Pat. Off. . |
| 336990 | 10/1989 | European Pat. Off. . |
| 383961 | 6/1990 | European Pat. Off. . |

OTHER PUBLICATIONS

P. H. Dawson & N. R. Whetten, "Non—Linear Resonances in Quadrupole Mass Spectrometers Due to Imperfect Fields—I. The Quadrupole Ion Trap", *International Journal of Mass Spectrometry and Ion Physics,* No. 2, 1969, pp. 45–59.

*Primary Examiner*—Bruce C. Anderson
*Attorney, Agent, or Firm*—Limbach & Limbach

[57] ABSTRACT

A mass spectrometry method in which trapped ions are excited in non-consecutive mass order for detection. The ions can be ejected from the trap in non-consecutive mass order for detection at an external detector, or detected at an in-trap detector in non-consecutive mass order before they leave the trap. In one embodiment, a sequence of supplemental AC voltage signals, each having a frequency matching a resonant frequency of one of the ions to be detected, is applied to a trap to resonate trapped ions in non-consecutive mass order. In another embodiment, the amplitude of the fundamental RF trapping voltage is varied while a sequence of supplemental AC voltage signals is applied to a trap to resonate trapped ions (or cause them to become unstable) in non-consecutive mass order. Another embodiment enables detection of both high mass ions and low mass ions with improved high mass resolution, when the ions are stably trapped in a three-dimensional quadrupole trapped field. In the latter embodiment, the amplitude of the fundamental RF trapping voltage is controlled to increase the Mathieu q coordinate of a high mass ion, and the high mass ion is then excited for detection.

13 Claims, 4 Drawing Sheets

MASS SPECTROMETRY METHOD WITH NON-CONSECUTIVE MASS ORDER SCAN

CROSS-REFERENCE TO RELATED APPLICATION

This application is a continuation-in-part of pending U.S. Pat. application Ser. No. 662,191, filed Feb. 28, 1991pending, entitled "Mass Spectrometry Method Using Supplemental AC Voltage Signals."

FIELD OF THE INVENTION

The invention relates to mass spectrometry methods in which trapped ions within an ion trap are excited in non-consecutive mass order for detection.

BACKGROUND OF THE INVENTION

In conventional mass spectrometry techniques, ions having mass-to-charge ratio within a selected range are isolated in an ion trap. The trapping field is then scanned to eject ions from the trap, in consecutive mass-to-charge order, for detection. For simplicity, throughout this specification, including in the claims, the phrase "consecutive mass order" will be used to denote consecutive mass-to-charge order.

Thus, trapped ions having mass-to-charge ratios m/z=37, m/z=38, m/z=39, and m/z=40, will be said to be ejected from a trap in consecutive mass order if they are ejected in either of the following two sequences: first m/z=37, then m/z=38, then m/z=39, and finally m/z=40; or first m/z=40, then m/z=39, then m/z=38, and finally m/z=37. However, the ions will be said to be ejected from the trap in non-consecutive mass order if they are sequentially ejected in the following order: first /z =37, then m/z=39, then m/z=38, and finally m/z =40.

In a class of conventional mass spectrometry techniques known as "MS/MS" methods, ions (known as "parent ions") having mass-to-charge ratio within a selected range are isolated in an ion trap. The trapped parent ions are then allowed, or induced, to dissociate (for example, by colliding with background gas molecules within the trap) to produce ions known as "daughter ions." The daughter ions are then ejected from the trap and detected.

For example, U.S. Pat. No. 4,736,101, issued Apr. 5, 1988, to Syka, et al., discloses an MS/MS method in which ions (having a mass-to-charge ratio within a predetermined range) are trapped within a three-dimensional quadrupole trapping field. The trapping field is then scanned to eject unwanted ions (ions other than parent ions having a desired mass-to-charge ratio) in consecutive mass order from the trap. The trapping field is then changed again to become capable of storing daughter ions of interest. The trapped parent ions are then induced to dissociate to produce daughter ions, and the daughter ions are ejected in consecutive mass order from the trap for detection.

U.S. No. 4,736,101 also teaches that a supplemental AC field can be applied to the trap during the period in which the parent ions undergo dissociation, in order to promote the dissociation process (see column 5, lines 43–62), or to eject a particular ion from the trap so that the ejected ion will not be detected during subsequent ejection and detection of sample ions (see column 4, line 60, through column 5, line 6)

U.S. No. 4,736,101 also suggests (at column 5, lines 7–12) that a supplemental AC field could be applied to the trap during an initial ionization period, to eject a particular ion (especially an ion that would otherwise be present in large quantities) that would otherwise interfere with the study of other (less common) ions of interest.

However, the conventional technique of ejecting trapped ions in consecutive mass order has several important disadvantages and limitations. During a prior art "consecutive mass order" scan, contaminating ions may unavoidably be produced in the trap, for example, as a result of undesired ion-molecule reactions, due to long storage times. Many of the resultant contaminating ions will not experience field conditions adequate to eject them from the trap, and will accumulate in the trap until their ion species is excited during the relevant portion of the consecutive mass scan. The contaminating ions' distorting effect on the data obtained during the scan becomes increasingly severe with elapsed time during a scan, to the extent that the concentration of contaminating ions increases with time. The inventive mass scan minimizes this distortion problem by enabling early excitation of selected trapped ions of interest, followed by subsequent excitation of other trapped ions of interest.

Another limitation of conventional "consecutive mass order" scanning is that the resolution obtainable inherently decreases with increasing ion mass-to-charge ratio, so that the quality of the data obtained during the early portion of a scan will typically differ significantly from that obtainable during the late portion of a scan.

Until the present invention, it was not known how to avoid both described limitations and disadvantages of conventional mass spectrometry methods in which trapped ions are ejected in consecutive mass order.

SUMMARY OF THE INVENTION

The invention is a mass spectrometry method in which trapped ions are excited in non-consecutive mass order for detection. In one class of embodiments, the ions are ejected from the trap in non-consecutive mass order for detection at an external detector. In another class of embodiments, the ions are excited in non-consecutive mass order, and are detected at an in-trap detector before they leave the trap.

In a preferred embodiment of the invention, a sequence of supplemental AC voltage signals is applied to a trap to resonate trapped ions in non-consecutive mass order (for in-trap detection or detection outside the trap). Each supplemental AC voltage signal has a frequency matching a resonant frequency of one of the ion species to be detected.

In another preferred embodiment of the invention, the amplitude of the fundamental RF trapping voltage is varied while a sequence of supplemental AC voltage signals is applied to a trap to resonate trapped ions (or cause them to become unstable) in non-consecutive mass order, for in-trap detection or detection outside the trap.

Another preferred embodiment enables detection of high mass ions (ions having high mass-to-charge ratio) and low mass ions (ions having low mass-to-charge ratio) with improved high mass resolution, when the ions are stably trapped in a three-dimensional quadrupole ion trap. Each of the stably trapped ions is characterized by a pair of coordinates (a,q) which correspond to a location on a conventional Mathieu diagram having vertical "a" axis and horizontal "q" axis. This preferred embodiment includes the steps of controlling the amplitude of the fundamental RF trapping voltage to increase the "q" coordinate of a high mass ion, and then exciting the high mass ion for detection. For example, the invention can include the steps of: exciting one or more low mass ions for detection (such as by applying one or more supplemental AC voltage signals to the trap to resonate each low mass ion for detection); then, controlling the amplitude of the fundamental RF trapping voltage to increase the "q" coordinate of a high mass ion; and then, applying a supplemental AC voltage signal to resonate the high mass ion for detection.

DETAILED DESCRIPTION OF THE PREFERRED EMBODIMENTS

Figure 1:
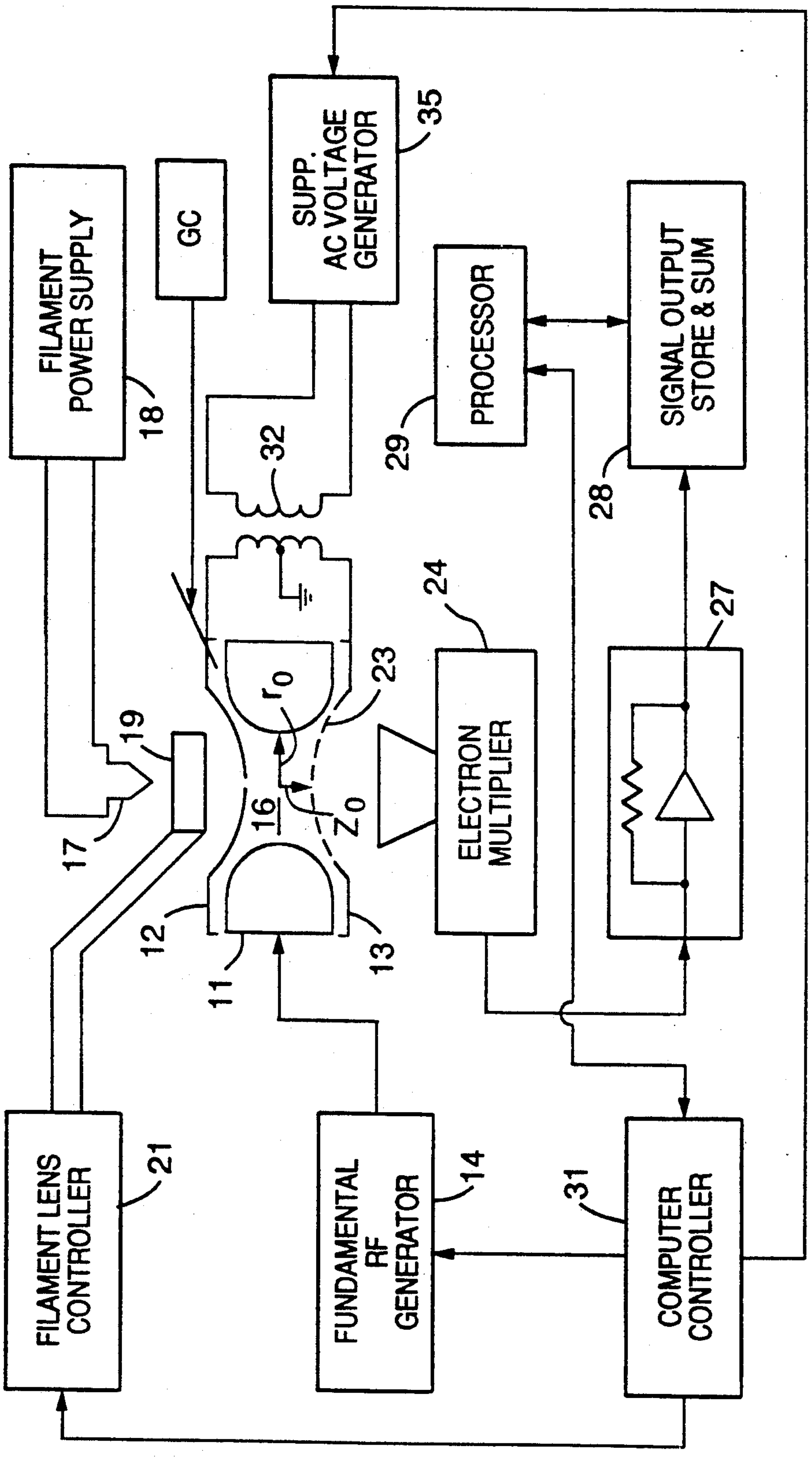
FIG. 1 is a simplified schematic diagram of an apparatus useful for implementing a class of preferred embodiments of the invention.

The quadrupole ion trap apparatus shown in FIG. 1 is useful for implementing a class of preferred embodiments of the invention. The FIG. apparatus includes ring electrode 11 and end electrodes 12 and 13. A three-dimensional quadrupole trapping field is produced in region 16 enclosed by electrodes 11–13, when fundamental voltage generator 14 is switched on to apply a fundamental RF voltage (having a radio frequency component and optionally also a DC component) between electrode 11 and electrodes 12 and 13. Ion storage region 16 has radius $r_o$ and vertical dimension $z_o$. Electrodes 11, 12, and 13 are common mode grounded through coupling transformer 32.

Supplemental AC voltage generator 35 can be switched on to apply a desired supplemental AC voltage signal across end electrodes 12 and 13. The supplemental AC voltage signal is selected (in a manner to be explained below in detail) to resonate desired trapped ions at their axial resonance frequencies.

Filament 17, when powered by filament power supply 18, directs an ionizing electron beam into region 16 through an aperture in end electrode 12. The electron beam ionizes sample molecules within region 16, so that the resulting ions can be trapped within region 16 by the quadrupole trapping field. Cylindrical gate electrode and lens 19 is controlled by filament lens control circuit 21 to gate the electron beam off and on as desired.

In one embodiment, end electrode 13 has perforations 23 through which ions can be ejected from region 16 for detection by an externally positioned electron multiplier detector 24. Electrometer 27 receives the current signal asserted at the output of detector 24, and converts it to a voltage signal, which is summed and stored within circuit 28, for processing within processor 29.

In a variation on the FIG. 1 apparatus, perforations 23 are omitted, and an in-trap detector is substituted. Such an in-trap detector can comprise the trap's end electrodes themselves. For example, one or both of the end electrodes could be composed (or partially composed) of phosphorescent material (which emits photons in response to incidence of ions at one of its surfaces). In another class of embodiments, the in-trap ion detector is distinct from the end electrodes, but is mounted integrally with one or both of them (so as to detect ions that strike the end electrodes without introducing significant distortions in the shape of the end electrode surfaces which face region 16). One example of this type of in-trap ion detector is a Faraday effect detector in which an electrically isolated conductive pin is mounted with its tip flush with an end electrode surface (preferably at a location along the z-axis in the center of end electrode 13). Alternatively, other kinds of in-trap ion detectors can be employed, such as ion detectors which do not require that ions directly strike them to be detected (examples of this latter type of detector include resonant power absorption detection means, and image current detection means). The output of each in-trap detector is supplied through appropriate detector electronics to processor 29.

Control circuit 31 generates control signals for controlling fundamental voltage generator 14, filament control circuit 21, and supplemental AC voltage generator 35. Circuit 31 sends control signals to circuits 14, 21, and 35 in response to commands it receives from processor 29, and sends data to processor 29 in response to requests from processor 29.

Figure 2:
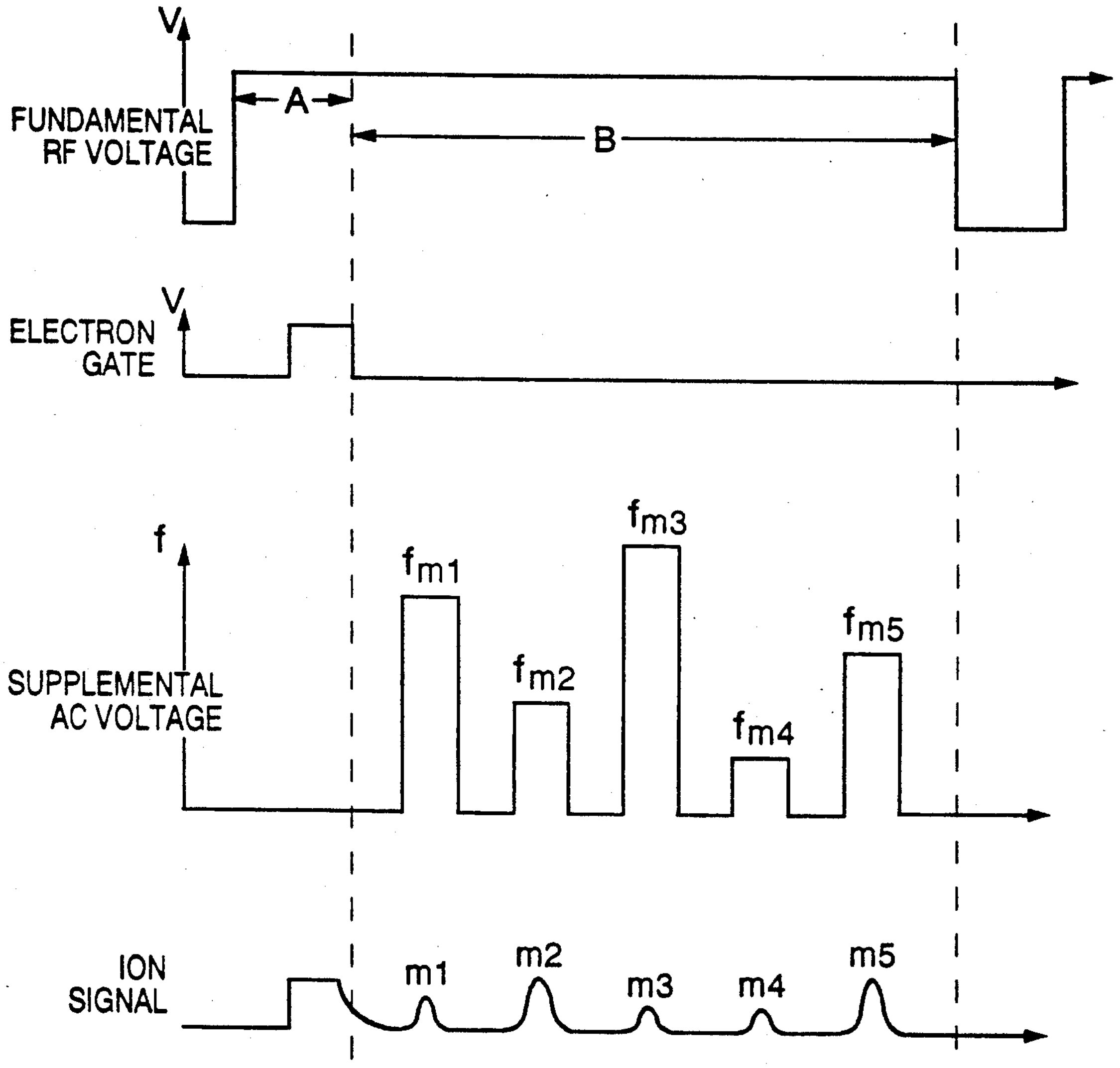
FIG. 2 is a diagram representing signals generated during performance of a first preferred embodiment of the invention.

A preferred embodiment of the inventive method will next be described with reference to FIG. 2. As indicated in FIG. 2, the first step of this method is to store ions in a trap (during period "A"). This can be accomplished by applying a fundamental voltage signal to the trap (by activating generator 14 of the FIG. 1 apparatus) to establish a quadrupole trapping field, and introducing an ionizing electron beam into ion storage region 16. Alternatively, the ions can be externally produced and then injected into storage region 16.

The fundamental voltage signal is chosen so that the trapping field will store (within region 16) ions having mass-to-charge ratio within a desired range. Other ions produced in the trap during period A which have mass-to-charge ratio outside the desired range will escape from region 16, possibly saturating detector 24 as they escape, as indicated by the value of the "ion signal" in FIG. 2 during period A.

Before the end of period A, the ionizing electron beam is gated off.

Then, during period B, supplemental AC voltage signals are applied to the trap (such as by activating generator 35 of the FIG. 1 apparatus) to resonate selected ions in non-consecutive mass order for detection. The frequency of each AC voltage signal matches the resonant frequency of a selected trapped ion mass. In the example represented in FIG. 2, ions of mass-to-charge ratios m1, m2, m3, m4, and m5 are sequentially resonated for detection, where m4<m2<m5<m1<m3.

The selected ions can be resonantly ejected from the trap for detection at an external detector, or resonantly excited for detection at an in-trap detector. The "ion signal" in FIG. 2 represents the output of the detector in either of these two alternative classes of embodiments.

In a variation on the FIG. 2 embodiment, after performing the steps described above to detect ions of mass ml, m2, m3, m4, and m5, additional steps can be performed to detect a set of higher mass ions (for example ions of mass m6, m7, and m8, where m3<m8 m6<m7). In this variation, the amplitude of the fundamental RF trapping voltage is controlled to increase the "q" coordinates of the high mass ions (the ions having mass m6, m7, and m8), and then applying a second set of supplemental AC voltage signals to resonate the high mass ions for detection. Each AC voltage signal in the second set has a frequency matching the resonant frequency of one of the high mass ions. By exciting the high mass ions for detection only after altering the trapping field parameters to increase the Mathieu "q" coordinate of the ions of interest, the high mass ions can be detected (in non-consecutive mass order) with higher resolution than could be obtained if they had been excited for detection with low "q" coordinates.

The Mathieu "a" and "q" coordinates represent the location of an ion (in a three-dimensional quadrupole trapping field) on a conventional Mathieu diagram having vertical "a" axis and horizontal "q" axis. The coordinates "a" and "q" are defined (for a three-dimensional quadrupole trapping field) as:

$$a=-8eU/mr^2\Omega^2, \text{ and}$$

$$q=4eV/mr^2\Omega^2,$$

where m/e is the mass-to-charge ratio of the ion, U is the DC component of the fundamental voltage which determines the trapping field, r is the fundamental radial trap dimension (i.e., the distance $r_o$ in FIG. 1), V is the RF component of the fundamental voltage which determines the trapping field, and Ω is the angular frequency of the RF component of the fundamental voltage.

Figure 3:
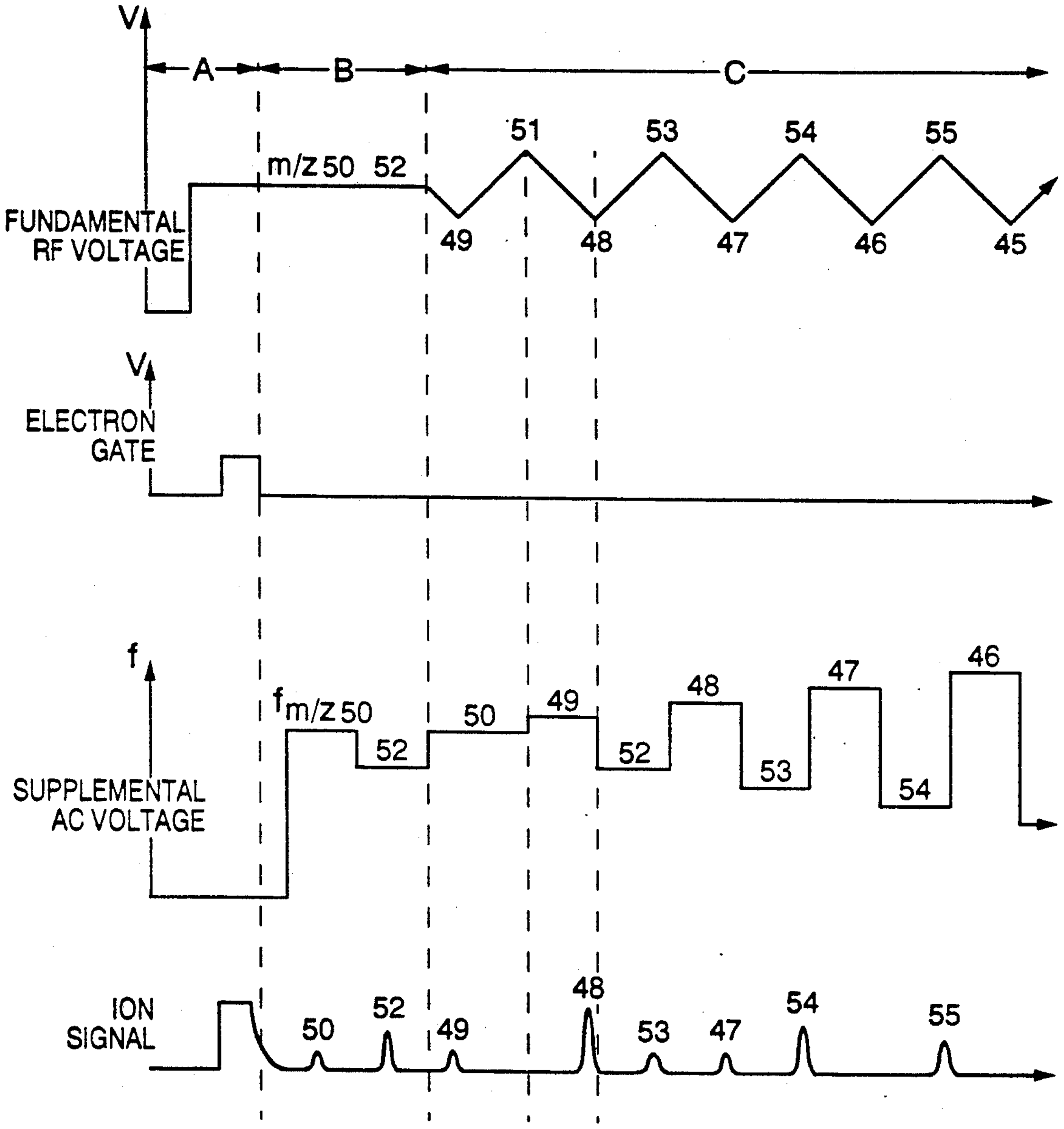
FIG. 3 is a diagram representing signals generated during performance of a second preferred embodiment of the invention.

A second preferred embodiment of the inventive method will next be described with reference to FIG. 3. As indicated in FIG. 3, the first step of this method is to store ions in a trap (during period "A"). This can be accomplished by applying a fundamental RF voltage signal to the trap (by activating generator 14 of the FIG. 1 apparatus) to establish a quadrupole trapping field, and introducing an ionizing electron beam into ion storage region 16. Alternatively, ions can be externally produced and then injected into storage region 16.

The fundamental voltage signal is chosen so that the trapping field will store ions having mass-to-charge ratio within a desired range (the example to be described with reference to FIG. 3 assumes that this range includes mass-to-charge ratios 45 through 55). Other ions produced in the trap during period A which have mass-to-charge ratio outside the desired range will escape from region 16, possibly saturating detector 24 as they escape, as indicated by the value of the "ion signal" in FIG. 3 during period A.

Before the end of period A, the ionizing electron beam is gated off.

Then, during period B, a supplemental AC voltage signal is applied to the trap (such as by activating generator 35 of the FIG. 1 apparatus). The frequency of this AC voltage signal matches the resonant frequency of the trapped ions of mass-to-charge ratio 50, so that trapped ions of this mass-to-charge ratio are resonated for in-trap or out-of-trap detection (as indicated by the peak labeled "50" in the "ion signal" shown in FIG. 3). Next, a second supplemental AC voltage signal is applied to the trap. The frequency of this second AC voltage signal matches the resonant frequency of the trapped ions of mass-to-charge ratio 52, so that trapped ions of this mass-to-charge ratio are resonated for in-trap or out-of-trap detection (as indicated by the peak labeled "52" in the "ion signal."

Next, during period C, the fundamental voltage signal is scanned to vary the trapping field parameters while a sequence of selected ions are resonantly excited for detection in non-consecutive mass order. By varying the trapping field parameters, the operating point of the trap is changed, in the sense that the Mathieu (a,q) coordinates of a trapped ion (to be detected) are changed. The Mathieu "a" and "q" coordinates represent the location of the ion on a conventional Mathieu diagram having vertical "a" axis and horizontal "q" axis, and are defined above.

During period C, the "q" coordinate of each trapped ion of interest is varied by sweeping the amplitude of the RF component of the fundamental voltage signal, as indicated in FIG. 3. Alternatively during period C, the frequency of the fundamental voltage signal can be swept to vary the "a" and "q" coordinates, or the amplitude of the DC component of the fundamental voltage signal can be swept to vary the "a" coordinate for each trapped ion of interest.

During period C of the FIG. 3 embodiment, ions of mass-to-charge ratio 49 are resonantly excited for detection by the following technique: the amplitude of the RF component of the fundamental voltage signal is decreased until the resonant frequency of ions having mass-to-charge ratio 49 becomes equivalent to the former resonant frequency of ions of mass-to-charge ratio 50 during period B (frequency "50"), and a supplemental AC voltage signal having frequency 50 is applied to the trap to resonate ions of mass-to-charge ratio 49.

Next during period C, ions of mass-to-charge ratio 51 are resonantly excited for detection by the following technique: the amplitude of the RF component of the fundamental voltage signal is increased until the resonant frequency of ions having mass-to-charge ratio 51 becomes equivalent to the frequency 50, and a supplemental AC voltage signal having frequency 50 is applied to the trap to resonate ions of mass-to-charge ratio 51. The fact that the "ion signal" in FIG. 3 has no peak during this period indicates that no ions of mass-to-charge ratio 51 were present in the trap as of the start of period C.

Next during period C, ions of mass-to-charge ratio 48 are excited for detection by the following technique: the amplitude of the RF component of the fundamental voltage signal is decreased until the resonant frequency of ions having mass-to-charge ratio 48 becomes equivalent to the former resonant frequency of ions of mass-to-charge ratio 49 during period B (frequency "49"), and a supplemental AC voltage signal having frequency 49 is applied to the trap to resonate ions of mass-to-charge ratio 48. The peak occurring in the "ion signal" shown in FIG. 3 during application of this supplemental voltage signal represents ions of mass-to-charge ratio 48 detected during this portion of period C.

Next during period C, ions of mass-to-charge ratio 53 are excited for detection by the following technique: the amplitude of the RF component of the fundamental voltage signal is increased until the resonant frequency of ions having mass-to-charge ratio 53 becomes equivalent to the former resonant frequency of ions of mass-to-charge ratio 52 during period B (frequency "52"), and a supplemental AC voltage signal having frequency 52 is applied to the trap to resonate ions of mass-to-charge ratio 53.

Next during period C, ions of mass-to-charge ratio 47 are excited for detection by the following technique: the amplitude of the RF component of the fundamental voltage signal is decreased until the resonant frequency of ions having mass-to-charge ratio 47 becomes equivalent to the former resonant frequency of ions of mass-to-charge ratio 48 during period B (frequency "48"), and a supplemental AC voltage signal having frequency 48 is applied to the trap to resonate ions of mass-to-charge ratio 47. The peak occurring in the "ion signal" shown in FIG. 3 during application of this supplemental voltage signal represents ions of mass-to-charge ratio 47 detected during this portion of period C.

Next during period C, ions of mass-to-charge ratio 54 are excited for detection by the following technique: the amplitude of the RF component of the fundamental voltage signal is increased until the resonant frequency of ions having mass-to-charge ratio 54 becomes equivalent to the former resonant frequency of ions of mass-to-charge ratio 53 during period B (frequency "53"), and a supplemental AC voltage signal having frequency 53 is applied to the trap to resonate ions of mass-to-charge ratio 54.

Next during period C, ions of mass-to-charge ratio 46 are excited for detection by the following technique: the amplitude of the RF component of the fundamental voltage signal is decreased until the resonant frequency of ions having mass-to-charge ratio 46 becomes equivalent to the former resonant frequency of ions of mass-to-charge ratio 47 during period B (frequency "47"), and a supplemental AC voltage signal having frequency 47 is applied to the trap to resonate ions of mass-to-charge ratio 46. The fact that the "ion signal" in FIG. 3 has no peak during this period indicates that no ions of mass-to-charge ratio 46 were present in the trap as of the start of period C.

Next during period C, ions of mass-to-charge ratio 55 are excited for detection by the following technique: the amplitude of the RF component of the fundamental voltage signal is increased until the resonant frequency of ions having mass-to-charge ratio 55 becomes equivalent to the former resonant frequency of ions of mass-to-charge ratio 54 during period B (frequency "54"), and a supplemental AC voltage signal having frequency 54 is applied to the trap to resonate ions of mass-to-charge ratio 55.

The scanning process can be continued to eject ions of mass lower than 46 and higher than 55.

The RF component of the fundamental voltage signal applied during performance of the FIG. 3 method will typically have peak-to-peak amplitude in the range from 0.1 to 10 volts during resonant excitation of relatively low mass ions (such as ions having mass-to-charge ratio in the range from 45 to 55 as indicated in FIG. 3), but will have much smaller peak-to-peak amplitude during resonant excitation of much higher mass ions (such as ions having mass-to-charge ratios in excess of 1000). The supplemental AC voltage signals applied during the FIG. 3 method will typically have peak-to-peak amplitude in the range from 1 to 10 volts.

In variations on the FIG. 3 method, ions are excited during period C in non-consecutive mass order by a mass selective instability technique, or by a combination of mass selective instability excitation and resonant excitation. For example, the ions can be ejected from a three-dimensional quadrupole field trap using a mass selective instability technique in a variation on the FIG. 3 method in which a DC fundamental voltage component is applied to the trap to cause the ions of interest to occupy a region of the Mathieu diagram having positive "a" coordinate. Once in this operating region, the trapping field is alternately varied to cause low mass ions to lose stability in the z-direction (shown in FIG. 1) and to cause high mass ions to lose stability in radial directions (directions perpendicular to the z-direction shown in FIG. 1). In another example, ions occupying a region of the Mathieu diagram having negative "a" coordinate are ejected from a three-dimensional quadrupole field trap using a mass selective instability technique in which the trapping field is varied to cause high and low mass ions alternately to lose stability in the z-direction.

In another variation on the FIG. 3 method, ions are excited during period C in non-consecutive mass order using a sum resonance excitation technique.

Another preferred embodiment enables detection of high mass ions and low mass ions with improved high mass resolution, when the ions are stably trapped in a three-dimensional quadrupole ion trap (with each stably trapped ion characterized by a pair of Mathieu coordinates "a" and "q"). This preferred embodiment includes the steps of controlling the amplitude of the fundamental RF trapping voltage to increase the "q" coordinate of one of the high mass ions, and then exciting that high mass ion for detection. One example of this preferred embodiment has already been discussed above as a variation on the FIG. 2 method.

Another example of this preferred embodiment includes the steps of: exciting one or more low mass ions for detection (such as by performing a version of the method of FIG. 3 in which supplemental AC voltage signals are applied to resonate each low mass ion for detection); then, controlling the amplitude of the fundamental RF trapping voltage to increase the "q" coordinate of a high mass ion; and then, applying a supplemental AC voltage signal to resonate the high mass ion for detection.

In performing the technique described in the previous paragraph, the trap always operates in a region of high "q" coordinate during non-consecutive mass order excitation of high and low mass ions (i.e., during alternate excitation of high and low mass ions). Thus, the technique eliminates the problem of poor resolution that is inherent in prior art techniques during excitation of high mass ions.

Figure 4:
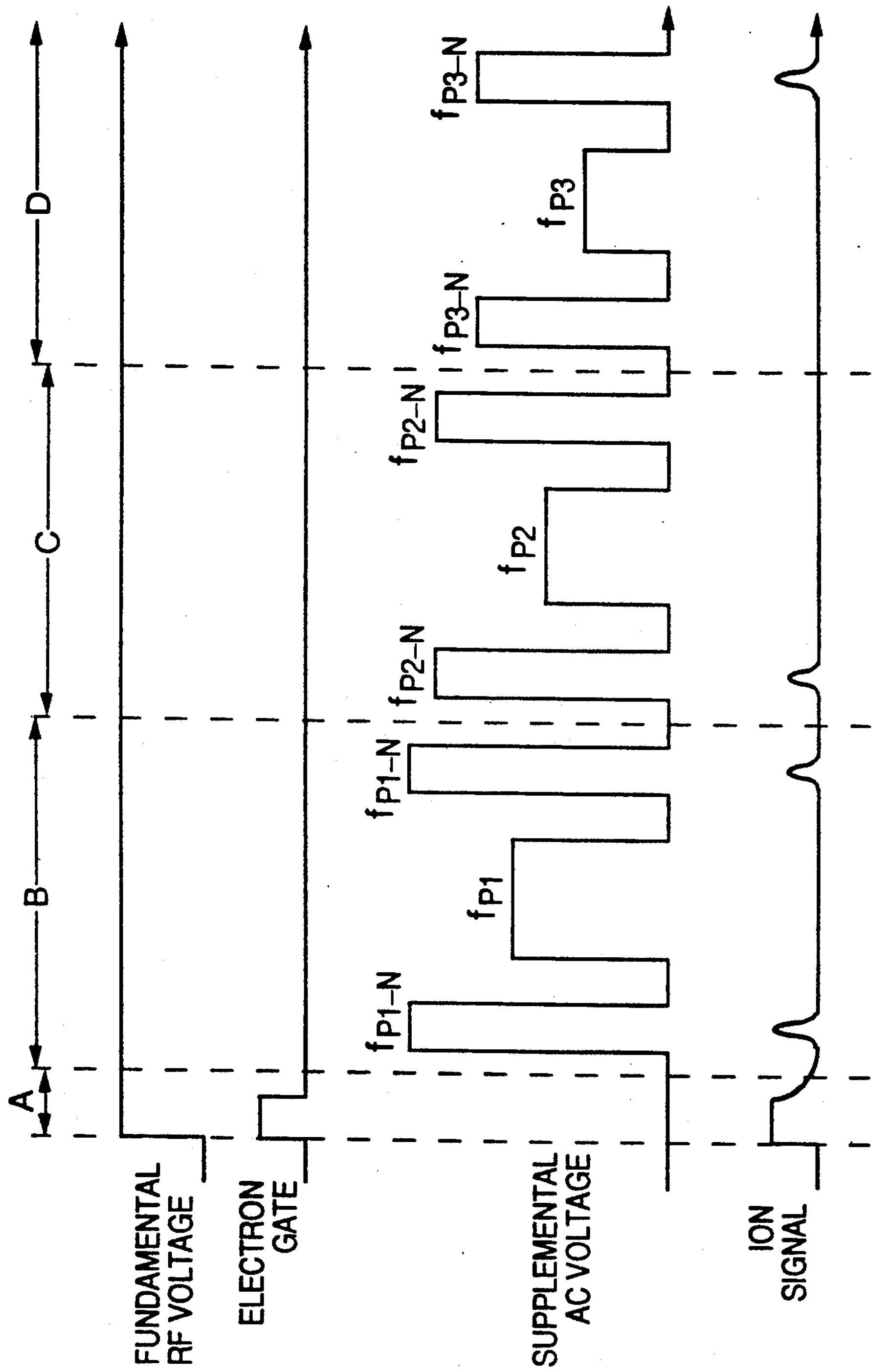
FIG. 4 is a diagram representing signals generated during performance of an alternative embodiment of the invention.

An alternative embodiment of the inventive method will next be described with reference to FIG. 4. As indicated in FIG. 4, the first step of this method is to store parent ions in a trap (during period "A"). This can be accomplished by applying a fundamental voltage signal to the trap (by activating generator 14 of the FIG. 1 apparatus) to establish a quadrupole trapping field, and introducing an ionizing electron beam into ion storage region 16. Alternatively, the parent ions can be externally produced and then injected into storage region 16.

The fundamental voltage signal is chosen so that the trapping field will store (within region 16) parent ions (for example, parent ions resulting from interactions between sample molecules and the ionizing electron beam) as well as daughter ions (which may be produced during periods "B," "C," "D," and "E") having mass-to-charge ratio within a desired range. Other ions produced in the trap during period A which have mass-to-charge ratio outside the desired range will escape from region 16, possibly saturating detector 24 as they escape, as indicated by the value of the "ion signal" in FIG. 4 during period A.

Before the end of period A, the ionizing electron beam is gated off.

Then, during period B, a first supplemental AC voltage signal is applied to the trap (such as by activating generator 35 of the FIG. 1 apparatus). This voltage signal has a frequency ($f_{P1-N}$) selected to resonantly excite a first ion (having molecular weight P1−N), and has enough power (i.e., sufficient amplitude) to resonate the first ion to a degree enabling it to be detected (by an external detector or an in-trap detector).

The FIG. 4 method is particularly useful for analyzing "neutral loss" daughter ions. A neutral loss daughter ion results from dissociation of a parent ion into two components: a daughter molecule (for example, a water molecule) having zero (neutral) charge and a molecular weight N (N will sometimes be denoted herein as a "neutral loss mass"); and a neutral loss daughter ion having a molecular weight P-N, where P is the molecular weight of the parent ion. Thus, during period B of the FIG. 4 method, the first supplemental signal resonates ions having the same mass-to-charge ratio as do neutral loss daughter ions later produced during application of the second supplemental voltage signal (having frequency $f_{P1}$).

Next (also during period B), the first supplemental voltage signal is switched off, and a second supplemental AC voltage signal is applied to the trap. The second supplemental AC voltage signal has frequency selected to induce dissociation of a first parent ion having molecular mass P1. The power of the second supplemental AC signal is lower than that of the first supplemental voltage signal (typically, it is on the order of 100 mV, while the power of the first supplemental voltage signal is on the order of 1 V). The power of the second supplemental AC voltage signal is sufficiently low that this signal does not resonate significant numbers of the ions it excites to a degree sufficient for them to be detected.

Next (also during period B), a third supplemental AC signal is applied to the trap. The third supplemental AC signal has frequency ($f_{P1-N}$), and amplitude sufficient to resonate neutral loss daughter ions having molecular weight Pl-N (produced earlier during period B during application of the second supplemental voltage signal) to a degree sufficient for in-trap or out-of-trap detection.

The ion signal portion present during period B of FIG. 4 has two peaks, which occur during application of the first and third supplemental voltage signals. The second peak can unambiguously be interpreted to represent neutral loss daughter ions produced during application of the second supplemental signal, even though the first peak cannot confidently be interpreted to represent neutral loss daughter ions resulting from dissociation of the first parent ion.

Next, during period C, fourth, fifth, and sixth supplemental AC voltage signals are sequentially applied to the trap, to enable detection of neutral loss daughter ions (having molecular weight P2-N) resulting from dissociation of a second parent ion (having molecular weight P2). The fourth and sixth supplemental voltage signals have frequency ($f_{P2-N}$) selected to resonantly excite a second ion (having molecular weight P2-N), and has enough power to resonate the second ion to a degree enabling it to be detected (by an external detector or an in-trap detector).

After application of the fourth supplemental voltage signal, this signal is switched off, and the fifth supplemental AC voltage signal is applied to the trap. The fifth supplemental AC voltage signal has frequency selected to induce dissociation of a second parent ion having molecular mass P2. The power of the fifth supplemental AC signal is lower than that of the fourth and sixth supplemental voltage signals (typically, it is on the order of 100 mV), and is sufficiently low that the fifth supplemental signal does not resonate significant numbers of the ions it excites to a degree sufficient for them to be detected.

Next (also during period C), the sixth supplemental AC signal is applied to the trap. The sixth supplemental AC signal has frequency ($f_{P2-N}$), and amplitude sufficient to resonate neutral loss daughter ions having molecular weight P2-N (produced earlier during period C during application of the fourth supplemental voltage signal) to a degree enabling them to be detected.

FIG. 4 reflects the possibility that no such neutral daughter ions will have been produced in response to application of the fifth supplemental signal. Thus, the ion signal portion occurring during application of the sixth supplemental signal (within period C of FIG. 4) has no peak representing detected neutral loss daughter ions produced by dissociation of the second parent ion during application of the fifth supplemental signal, although the ion signal does have a peak representing sample ions detected during application of the fourth supplemental signal.

Finally, during period D, seventh, eighth, and ninth supplemental AC voltage signals are sequentially applied to the trap, to enable detection of neutral loss daughter ions (having molecular weight P3-N) resulting from dissociation of a third parent ion (having molecular weight P3). The seventh and ninth supplemental voltage signals have frequency ($f_{P3-N}$) selected to resonantly excite a third ion (having molecular weight P3-N), and each has enough power to resonate the third ion to a degree enabling it to be detected (by an external detector or an in-trap detector).

After application of the seventh supplemental voltage signal, this signal is switched off, and the eighth supplemental AC voltage signal is applied to the trap. The eighth supplemental AC voltage signal has frequency selected to induce dissociation of a third parent ion having molecular mass P3. The power of the eighth supplemental AC signal is lower than that of the seventh and ninth supplemental voltage signals (typically, it is on the order of 100 mV), and is sufficiently low that the eighth supplemental signal does not resonate significant numbers of the ions it excites to a degree sufficient for them to be detected.

Next (also during period D), the ninth supplemental AC signal is applied to the trap. The ninth supplemental AC signal has frequency ($f_{P3-N}$), and amplitude sufficient to resonate neutral loss daughter ions having molecular weight P3-N (produced during application of the seventh supplemental voltage signal) to a degree enabling them to be detected.

The ion signal portion occurring during application of the ninth supplemental signal (within period D of FIG. 4) has a peak representing detected neutral loss daughter ions produced by dissociation of the third parent ion during application of the eighth supplemental signal, although the ion signal has no peak representing ions detected during application of the seventh supplemental signal.

In one variation on the FIG. 4 method, only the operations described with reference to periods A and B are performed, to detect neutral loss daughter ions of only one parent ion. In other variations on the FIG. 4 method, additional sequences of operations are performed (each including steps corresponding to those described with reference to period B, C, or D), to detect neutral loss daughter ions of more than just three parent ions (as in the FIG. 4 embodiment).

In accordance with the invention, the neutral loss daughter ions detected in periods B, C, and D are detected in non-consecutive mass order.

In general, the resonant frequency of each neutral loss daughter ion will differ from the resonant frequency of its parent ion. Thus, in one class of embodiments the frequency of each high power supplemental AC voltage signal applied during one of periods "B," "C," or "D" of FIG. 4 will differ from the frequency of the low power supplemental AC voltage signal applied during the same period of FIG. 4. However, it is also within the scope of the FIG. 4 embodiment to change the trapping field parameters (i.e., one or more of the frequency or amplitude of the AC component of the fundamental RF voltage, or the amplitude of a DC component of the fundamental RF voltage) following application of each low power supplemental AC voltage signal and before application of the next high power supplemental AC voltage signal. By so changing the trapping field, the frequency of each neutral loss daughter ion (the frequency at which each neutral loss daughter ion moves in the trapping field) is correspondingly changed, and indeed the frequency of each neutral loss daughter ion can be caused to match the frequency of the low power supplemental AC signal. In this latter case, both the high power supplemental AC voltage signal and the low power supplemental AC voltage signal can have the same frequency (although these two supplemental AC voltage signals are applied to "different" trapping fields).

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A mass spectrometry method, including the steps of:

(a) establishing a trapping field capable of trapping ions within a trap region bounded by a set of electrodes;

(b) exciting ions stably trapped in the trap region in non-consecutive mass order: and (c) detecting the excited ions in non-consecutive mass order.

2. The method of claim 1, wherein the trapping field is a three-dimensional quadrupole trapping field.

3. The method of claim 1, wherein step (b) includes the steps of:

resonating the trapped ions by applying a sequence of supplemental AC voltage signals to the electrodes, wherein each of the supplemental AC voltage signals has a frequency matching a resonant frequency of one of the trapped ions.

4. The method of claim 1, wherein the trapping field has an RF component having a peak-to-peak amplitude, and wherein step (b) includes the steps of:

(c) sweeping the peak-to-peak amplitude of the RF component of the trapping field; and (d) while performing step (c), resonating the trapped ions in non-consecutive mass order by applying a sequence of supplemental AC voltage signals to the electrodes, wherein each of the supplemental AC voltage signals has a frequency matching a resonant frequency of one of the trapped ions.

5. The method of claim 1, wherein step (b) sequentially excites the trapped ions in non-consecutive mass order by performing a mass selective instability ejection operation.

6. The method of claim 5, wherein the trapping field has an RF component having a peak-to-peak amplitude, and wherein step (b) includes the steps of:

(c) sweeping the peak-to-peak amplitude of the RF component of the trapping field; and (d) while performing step (c), applying a sequence of supplemental AC voltage signals to the electrodes.

7. The method of claim 1, wherein step (b) sequentially excites the trapped ions in non-consecutive mass order by performing a sum resonance excitation technique.

8. The method of claim 1, wherein the trapping field has an RF component having a peak-to-peak amplitude, and wherein step (b) includes the steps of:

(c) resonating trapped ions having mass-to-charge ratio A in the range $N<A<N+M$ for detection, where N and M are positive values, by applying a sequence of supplemental AC voltage signals to the electrodes, wherein each of the supplemental AC voltage signals has a frequency matching a resonant frequency of one of the trapped ions having mass-to-charge ratio in said range $N<A<N+M$;

(d) decreasing the peak-to-peak amplitude of the RF component of the trapping field while applying a first supplemental AC voltage signal to the electrodes, wherein the frequency of the first supplemental AC voltage signal is selected to resonate trapped ions having mass-to-charge ratio less than N; and (e) after step (d), increasing the peak-to-peak amplitude of the RF component of the trapping field while applying a second supplemental AC voltage signal to the electrodes, wherein the frequency of the second supplemental AC voltage signal is selected to resonate trapped ions having mass-to-charge ratio greater than $N+M$.

9. The method of claim 1, wherein the trapping field is a three-dimensional quadrupole trapping field, wherein each ion stably trapped within the trapping field has a Mathieu coordinate q, wherein the trapping field has an RF component having a peak-to-peak amplitude, and wherein step (b) includes the steps of:

(c) controlling the peak-to-peak amplitude of the RF component of the trapping field to increase the coordinate q of a first ion;

(d) after step (c), exciting the first ion for detection.

10. The method of claim 9, wherein the trapping field is a three-dimensional quadrupole trapping field, wherein each ion stably trapped within the trapping field has a Mathieu coordinate q, wherein the trapping field has an RF component having a peak-to-peak amplitude, and wherein step (b) includes the steps of:

(c) exciting a first ion for detection;

(d) controlling the peak-to-peak amplitude of the RF component of the trapping field to increase the coordinate q of a second ion, wherein the second ion has mass-to-charge ratio greater tan that of the first ion; and (e) after step (d), exciting the second ion for detection.

11. The method of claim 10, wherein step (e) includes the step applying a supplemental AC voltage signal to the electrodes to resonate the second ion for detection.

12. A mass spectrometry method, including the step of:

(a) establishing a trapping field capable of trapping ions within a trap region bounded by a set of electrodes, wherein the traping field has an RF component having a peak-to-peak amplitude; and (b) resonating ions stably trapped in the trap region for detection in non-consecutive mass order, by performing the following steps:

applying first supplemental AC voltage signals to the electrodes, wherein the first supplemental AC voltage signals have frequencies which match resonant frequencies of selected ones of the ions having mass-to-charge ratio greater than a value N but less than a greater value N+M;

decreasing the peak-to-peak amplitude of the RF component of the trapping field while applying a second supplemental AC voltage signal to the electrodes, wherein the frequency of the second supplemental AC voltage signal is selected to resonant one of the ions having mass-to-charge ratio N-A, where N-A is less than N;

then, increasing the peak-to-peak amplitude of the RF component of the trapping field while applying the second supplemental AC voltage signal to the electrodes;

then, decreasing the peak-to-peak amplitude of the RF component of the trapping field while applying a third supplemental AC voltage signal to the electrodes, wherein the frequency of the third supplemental AC voltage signal is selected to resonant one of the ions having mass-to-charge ratio N+M+B, where N+M+B is greater than N+M; and (c) detecting the ions resonated during application of the second supplemental AC voltage signal and the third supplemental AC voltage signal.

13. The method of claim 12, wherein the trapping field is a three-dimensional quadrupole trapping field, wherein each ion stably trapped within the trapping field has a Mathieu coordinate q, and also including the steps of:

(d) controlling the peak-to-peak amplitude of the RF component of the trapping field to increase the coordinate q of a second set of ions, wherein the ions in the second set have mass-to-charge ratio greater than the value N+M+B; and (e) after step (d), exciting the ions in the second set for detection in non-consecutive mass order; and (f) detecting the ions excited during step (e) in non-consecutive mass order.

* * * * *